United States Patent [19]
Atkin et al.

[11] Patent Number: 5,900,871
[45] Date of Patent: May 4, 1999

[54] SYSTEM AND METHOD FOR MANAGING MULTIPLE CULTURAL PROFILES IN AN INFORMATION HANDLING SYSTEM

[75] Inventors: Steven Edward Atkin; Kenneth Wayne Borgendale; John D Howard, all of Austin, Tex.

[73] Assignee: International Business Machines Corporation, Armonk, N.Y.

[21] Appl. No.: 08/813,401

[22] Filed: Mar. 10, 1997

[51] Int. Cl.$^6$ ........................................... G06F 3/00
[52] U.S. Cl. .................................. 345/334; 704/8
[58] Field of Search ................... 345/326–358; 704/8

[56] References Cited

U.S. PATENT DOCUMENTS

| | | | |
|---|---|---|---|
| 4,937,760 | 6/1990 | Beitel et al. | 364/513 |
| 5,251,130 | 10/1993 | Andrews et al. | 704/8 |
| 5,416,903 | 5/1995 | Malcolm | 345/333 |
| 5,434,776 | 7/1995 | Jain | 704/8 |
| 5,450,538 | 9/1995 | Glaser et al. | 345/333 |
| 5,499,335 | 3/1996 | Silver et al. | 704/8 |
| 5,513,342 | 4/1996 | Leong et al. | 345/333 |
| 5,526,268 | 6/1996 | Tkacs | 364/419 |
| 5,546,521 | 8/1996 | Martinez | 395/155 |
| 5,564,050 | 10/1996 | Barber et al. | 395/600 |
| 5,583,761 | 12/1996 | Chou | 395/798 |
| 5,583,981 | 12/1996 | Pleyer | 345/333 |
| 5,596,690 | 1/1997 | Stone et al. | 395/133 |
| 5,603,031 | 2/1997 | White et al. | 395/683 |
| 5,659,337 | 8/1997 | Tananka et al. | 704/8 |
| 5,664,206 | 9/1997 | Murow et al. | 704/8 |
| 5,671,378 | 9/1997 | Acker et al. | 345/334 |
| 5,675,818 | 10/1997 | Kennedy | 704/8 |
| 5,678,039 | 10/1997 | Hinks et al. | 704/8 |

OTHER PUBLICATIONS

"Language Flag Icon," *Research Disclosure* No. 34026, Aug. 1992.

"Specification of Default Formatting Information in a Computer Application Profile," *IBM Technical Disclosure Bulletin*, vol. 32, No. 3A, pp. 210–211, Aug. 1989.

"LAN Server Generic Alert Definition Keywords," *IBM Technical Disclosure Bulletin*, vol. 36, No. 09A, pp. 185–191, Sep. 1993.

"Traveling User Client Profile," *IBM Technical Disclosure Bulletin*, vol. 37, No. 3, p. 167, Mar. 1994.

"Subobjects and Enhanced Object Context Sensitivity," *IBM Technical Disclosure Bulletin*, vol. 37, no. 10, pp. 279–280, Oct. 1994.

"Installable Actions and Profiles," *IBM Technical Disclosure Bulletin*, vol. 38, No. 05, pp. 547–553, May 1995.

"Setting Default Internationalization Values when No Values are Available," *IBM Technical Disclosure Bulletin*, vol. 39, no. 7, pp. 245–247, Jul. 1996.

Cowart, "Mastering WINDOWS 3.1", Sybex, pp. 175–177, 1993.

*Primary Examiner*—John E. Breene
*Attorney, Agent, or Firm*—Leslie A. Van Leeuwen; Jeffrey S. LaBaw

[57] ABSTRACT

The present invention is directed to a system and method for dynamically managing cultural profiles within an information handling system. Cultural profiles may be created, modified, or deleted without having to reboot the information handling system. The cultural profile changes are immediately effective in the system. A user may dynamically change a program's cultural profile to a new or modified cultural profile without having to reboot the system. The system and method of the present invention enable programs to be globalized/localized to support many different countries and cultures. A user may define a new program profile based on an existing profile. This allows for substantial reuse of code, and saves time for the user because new cultural profiles do not have to be completely created from scratch. In addition, a user may modify or delete a currently existing program profile. The dynamic creation, modification, or deletion of cultural profiles is done by using a dynamically linked library, containing all system defined cultural profiles, in combination with a user locale file which is used to store newly defined cultural profiles, along with user modifications and deletions of existing cultural profiles.

21 Claims, 9 Drawing Sheets

SYSTEM AND METHOD FOR MANAGING MULTIPLE CULTURAL PROFILES IN AN INFORMATION HANDLING SYSTEM

CROSS-REFERENCE TO RELATED APPLICATIONS

The subject matter of this application is related to application Ser. No. 08/519,331 for "Dynamic Object-Oriented Extended Locale Object," filed on Aug. 25, 1995, abandoned Mar. 1, 1998, application Ser. No. 08/519,491 for "Dynamic Object-Oriented Extended Customization Object," filed on Aug. 25, 1995, abandoned Mar. 1, 1998, application Ser. No. 08/573,016 for "Graphical Locale Object Builder," filed on Dec. 15, 1995, abandoned Mar. 1, 1998 and co-pending application Ser. No. 08/813,402, entitled "System and Method for Utilizing Context Sensitive Profiles in an Information Handling System," filed concurrently with this application. The foregoing applications are assigned to a common assignee with this application, and are incorporated herein by reference.

FIELD OF THE INVENTION

The present invention relates to the field of information handling systems and, more particularly, to a system and method for program profile information in an information handling system.

BACKGROUND OF THE INVENTION

Software products must be flexible to adapt to the needs of the user. Software products developed in one country that seek an international presence must be modified to fit the needs of markets in other countries. For example, spreadsheets are used in many disciplines by users all over the world, but many spreadsheet programs are developed using underlying assumptions (i.e. monetary symbols, fractional representations) based on the country in which the program is developed. In order for a user in another country to use the spreadsheet program, the user must spend many hours customizing the program to meet her particular needs. Another example of programs that are typically culture-specific are help programs. Modifying a help program to be responsive to the needs of a user in another country involves much more than simply translating error messages.

Internationalization is the process of removing language and cultural dependencies from software applications. Localization is the process of reinserting a specific set of values for the language and cultural attributes removed during internationalization. Developers must be aware of the cultural dependencies in localizing their applications. How well a developer internationalizes and localizes its application may be the single biggest factor in determining the success or failure of an organization's products in other countries.

One issue involved in internationalizing and localizing an application is language translation. When translating an application, developers must be concerned with the accuracy of the translation, the introduction of defects during the translation process (i.e. the introduction of defects into an application that were not previously present), and maintenance for every translated version of the application.

However, language translation of applications alone is not enough to make an application internationalized. User interfaces are highly graphical and contain more than simple text strings. Graphical user interface systems have made applications easy to use, but have also made these same applications highly culturally dependent. For example, the color red may indicate "stop" or "warning" in one culture, and have an entirely different meaning, such as "go," in another culture. Thus, an application which uses a red icon as a warning flag, may need to use a different color icon in a different country.

The process of localizing an application for a different country or culture is simply too complex and time-consuming to do individually for each culture. What is needed is a process for simultaneously developing software for all cultural markets. It is important that this process remain consistent with modern software engineering standards for it to be effective. The internationalization process must be capable of being incorporated into current software development methodologies, such as object oriented development and functional decomposition.

Several prior art attempts have been made to arrive at a standardized procedure for solving internationalization issues. For example, one type of international product model enables all groups involved in internationalization to share a common understanding of the components that make up an international product. These components include an international base component, a user interface component, a market specific component and a country specific information component. The international base component contains an application's basic functional code, such as executable images, internal data files, and command procedures without text. The user interface component is language specific and is localized to meet the cultural requirements of the specific group of users. The market specific component meets the special requirements of a specific region and provides enhancement only. The country specific information component is a set of required documentation needed to meet regulations for selling a product in a specific country. One disadvantage of this prior art approach is that it places a large burden of internationalization/localization on local programmers and translators, rather than providing localized interfaces inside of the base operating system. This methodology requires that multiple translations be done for similar information by programmers writing applications for the same operating system.

Another approach is to use native language support (NLS), which provides developers with a library to aid in the internationalization/localization process. NLS includes a set of routines to replace the standard program libraries, along with a set of tools to assist in the construction of message catalogs and local databases. Message catalogs contain textual information that an application might require during localization. These catalogs are then further broken down into sets for ease of interaction. Applications make a request to the NLS system at run time. The NLS then returns a particular word or phrase in the current language. The disadvantage of this approach is that NLS applications require mapping of standard routines into NLS routines, and generation extraction of the messages catalogs. In addition, the NLS approach only allows for the localization of textual and numeric information. It does not handle graphical or auditory information.

A similar prior art NLS approach is used in windows-type systems, such as Microsoft Windows (Microsoft Windows is a trademark of Microsoft Corporation). To help facilitate internationalization/localization in a windows environment, the window subsystem provides NLS application programmer interfaces (APIs) which give applications access to culturally correct string comparisons, collation tables for sorting different languages, date, time, and currency formatting functions, and functions to determine which locale is in effect and which other locales are present on the system. In a properly enabled window program, NLS must be isolated from other parts of an application. NLS function calls must be provided at all points where language dependent operations are required. Unfortunately, the windows application in internationalization/localization also only allows for the localization of textual and numeric information. It does not handle graphical or auditory information.

Another approach is used in the OS/2 operating system (OS/2 is a trademark of International Business Machines Corporation). The OS/2 NLS approach consists of two phases, the first being function development and the second being translation. Function development allows a programmer to work in a standard language, such as double byte character set (DBCS) or Unicode characters having Unicode functions. However, the current approach in OS/2 is limited in that it urges programmers to separate localizable information into resource files. This means that localization teams must then repeatedly translate similar material, rather than having it be part of the base operating system.

Currently, there exists a notion of a locale object. Note that the locale object as it exists in the prior art is not a true object, because it does not encapsulate localization data with the operations that work on the data. The locale object contains support for formatting of time, date and currency information along with support for collation of strings. However, the prior art type of locale object is not readily extendable to allow for the addition of new cultural attributes. Prior art locale objects do not support graphical localization information such as icons, dialogues, menus, and colors, and also do not support sound localization information such as warning, success, and failure beeps. Moreover, prior art locale objects do not support textual localization information such as warning, success, and failure messages.

Finally, prior art locale objects can not be dynamically created. In addition, operating systems only allow one cultural profile to be used at any given time across the entire operating system. The system's cultural profile can not be dynamically changed. In order to change the system's cultural profile, the operating system must be rebooted.

Consequently, there is a need for a system and method which allows users of an information handling system to dynamically create new cultural profiles and modify existing cultural profiles. It would be desirable to allow the user to dynamically change the cultural profile of an application while the application is executing. In addition, it would be desirable to allow the user to individually change the cultural profile of each application in the system separately, so that each application may utilize a different cultural profile.

SUMMARY OF THE INVENTION

Accordingly, the present invention is directed to a system and method for dynamically managing cultural profiles within an information handling system. Cultural profiles may be created, modified, or deleted without having to reboot the information handling system. The cultural profile changes are immediately effective in the system. A user may dynamically change a program's cultural profile to a new or modified cultural profile without having to reboot the system. The system and method of the present invention enable programs to be globalized/localized to support many different countries and cultures.

One advantage of the present invention is that a user may define a new cultural profile based on an existing profile. This allows for substantial reuse of code, and saves time for the user because new cultural profiles do not have to be completely created from scratch. Another advantage of the present invention is that the user may modify or delete a currently existing cultural profile. A further advantage of the present invention is that the cultural profile of a program may be dynamically changed, while the program is executing. The profile change takes place through the use of a drag and drop facility within the information handling system. Each program may have its cultural profile changed independently, and changing the cultural profile of one program has no effect on the program profiles of other programs executing in the information handling system.

The dynamic creation, modification, or deletion of cultural profiles is done by using a user locale file in combination with a dynamically linked library supplied by the information handling system. The dynamically linked library contains all system defined cultural profiles, and is loaded when the system is booted. The user locale file contains all newly defined cultural profiles, along with user modifications and deletions of existing cultural profiles. When the system is booted, the operating system checks to see if a user locale file exists, and if so, the information in the user locale file overrides any corresponding information in the dynamically linked library. The present invention allows information handling systems to be customized to support any culture or combination of cultures.

One of the embodiments of the invention is as sets of instructions resident in an information handling system.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, where like reference numerals are used to identify like parts in the various views and in which.

DETAILED DESCRIPTION OF THE PREFERRED EMBODIMENT

Figure 1:
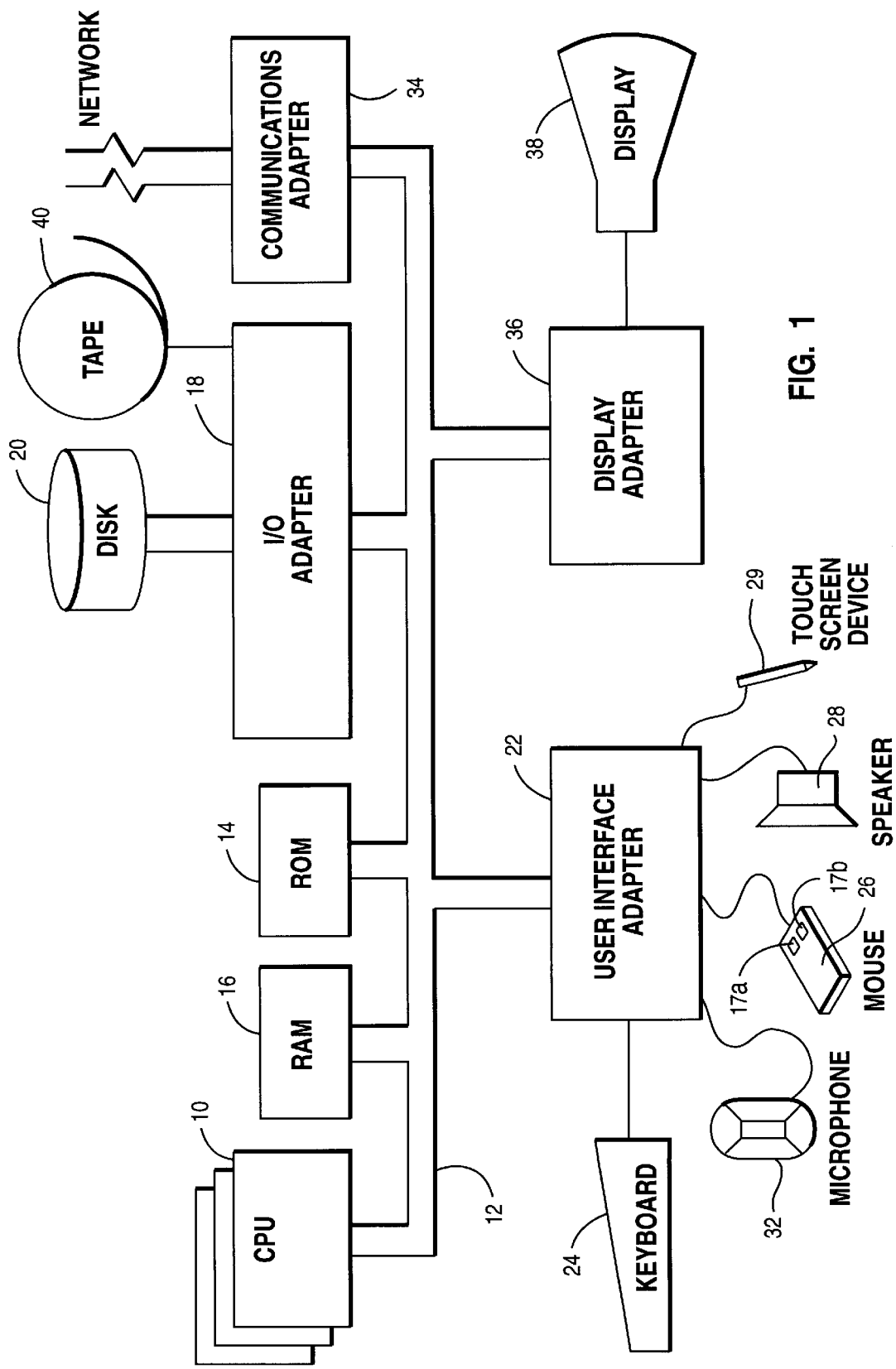
FIG. 1 is a block diagram of an information handling system capable of executing the dynamic locale system of the present invention.

The invention may be implemented on a variety of hardware platforms, including personal computers, workstations, minicomputers, and mainframe computers. Many of the steps of the method according to the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20 and tape drives 40 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Communication adaptor 34 may link the system depicted in FIG. 1 with hundreds or even thousands of similar systems, or other devices, such as remote printers, remote servers, or remote storage units.

Object oriented programming has established itself as an important methodology in developing high quality, readable code that executes on systems, such as the information handling system depicted in FIG. 1. The present invention includes a dynamic, object-oriented locale object that expands the currently defined notion of a locale by encapsulating localization information and localization procedures into a cohesive unit, thereby enabling an application to be internationalized. The locale object is then extended to allow for different cultural attributes, such as color, icons, dialogues, and menus. To further enhance the functionality of the extended locale object, the locale object also allows domain or application specific localization information to be contained therein. The language used to implement the present invention is primarily C++ for OS/2, and the concepts of software programming, especially in object-oriented programming, are detailed in U.S. Pat. No. 5,361,350, entitled "Object Oriented Method Management System and Software for Managing Class Method Names in a Computer System," commonly assigned to the Assignee of the present invention and herein incorporated by reference for all purposes.

The operating system provides a domain customization object, such as an extended locale object used in internationalization/localization, that can dynamically change during the execution of an application, along with a mechanism for effecting locale changes at run time. The customization object contains the information necessary to effect the customization. For example, the international domain customization object enables the operating system to return an extended locale object describing the current application's international settings upon a request for the extended locale object. For illustrative purposes, the extended locale object used for internationalization/localization will now be described.

Upon user request through an application, the extended locale object provides the following localization information, for example:

Day: a string containing the name of a day, given a particular day of the week.

Month: a string containing the name of a month, given a particular month of the year.

Date: a formatted string containing a date, given a particular day, month, and year.

Time: a formatted string, containing a time, given hours, minutes, and seconds.

Currency symbol: a string containing the international currency identifier for the current locale.

Decimal: a string containing the symbol used to separate fractional quantities from whole quantities in the current locale.

Thousands: a string containing the symbol used to separate multiples of 1,000.

Sign: a string containing the symbol used to represent positive and negative quantities for the current locale.

Fractional quantities: a number representing the number of digits to display after the decimal point in monetary quantities.

Menu: a translated common user access (CUA) menu bar, when given a request for a standard menu bar.

Dialogue: a localized dialogue box containing an icon and color appropriate for the type of dialogue and current locale, given a specific request for a CUA dialogue box.

String: a translated string based upon the current locale, when given a specific request for a pre-defined operating system string.

Locale changes are performed through the use of a customization change daemon, also referred to as a locale change daemon. Note that a daemon is a program that lies dormant, waiting for a condition or conditions to occur. Upon the occurrence of a particular condition or conditions, the daemon wakes up, performs a particular task, and then becomes dormant again.

In the present invention, the locale change daemon takes the form of a drag and drop presentation manager application. The locale change daemon stays suspended until a user clicks on it with a mouse operation. When the daemon is invoked, a locale change may take place by simply dragging a locale change object and dropping it on top of an application.

Figure 2:
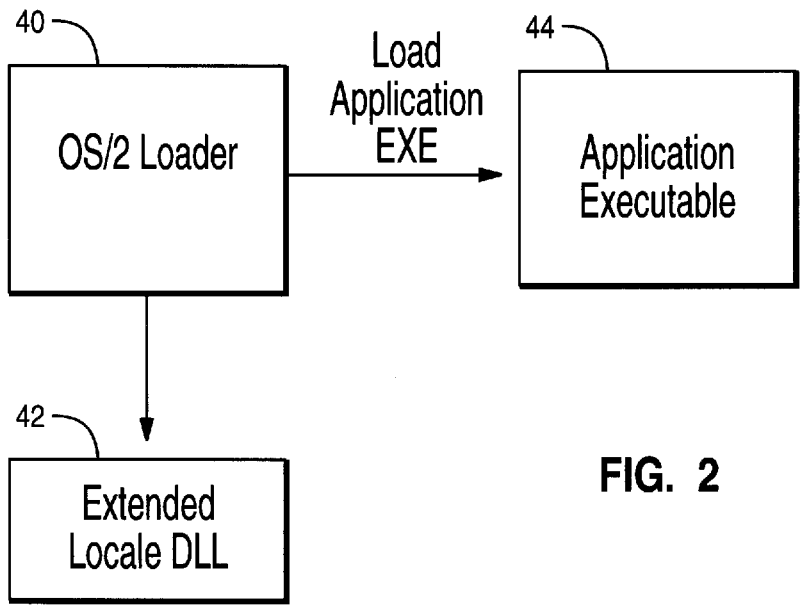
FIG. 2 is a block diagram depicting an application start-up according to the present invention.
Figure 3:
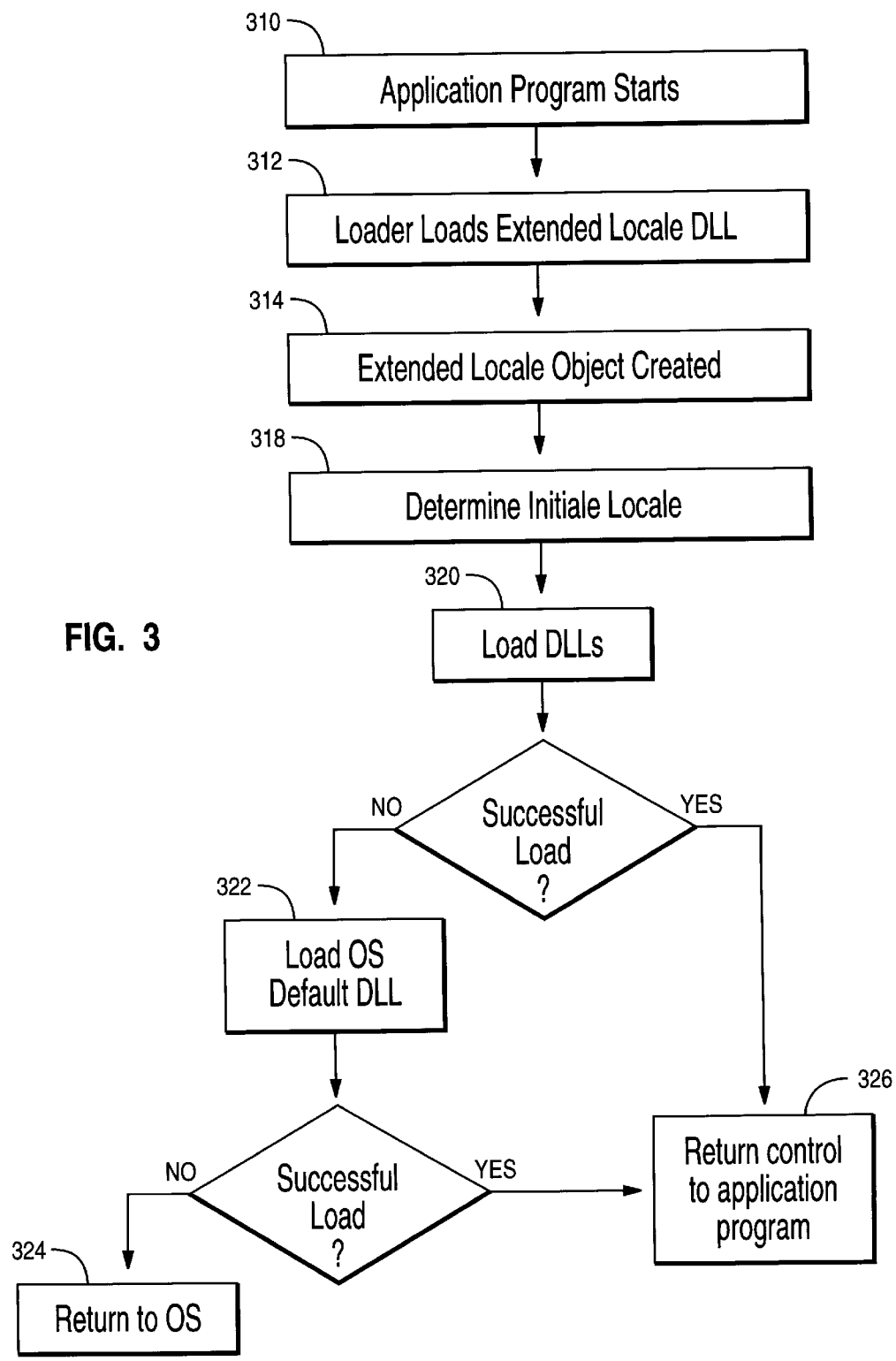
FIG. 3 is a flow chart illustrating the method of the present invention.

Referring now to FIG. 2, a block diagram representing an application start-up will be described. A flow chart depicting the method of the present invention is illustrated in FIG. 3, and will also be described. When an application 44 starts execution (step 310), loader 40 attempts to load extended locale DLL 42 (step 312), which contains the object code for the extended locale object. If the load is successful, extended locale object 48 is created (step 314).

After extended locale object 48 is created, it then examines an environment variable, referred to as LOCALE, in order to determine the initial locale (step 318). This environment variable is set to a default value, such as USA, by the operating system. The environment variable may be changed to any default value by simply typing "SET LOCALE value" at any operating system prompt, where "value" is any supported locale. This allows the system to have multiple operating system sessions running concurrently, with different values for each initial start up locale.

The system and method of the present invention allow a user to dynamically create new locales, and dynamically delete or modify existing locales. FIGS. 7 through 11 (described below) illustrate the method used to create a new locale object, or cultural profile.

After extended locale object 48 has determined the appropriate starting locale, it attempts to load all necessary DLLs required to support the requested locale (step 320). If, during this load process, extended locale object 48 determines that it cannot support the requested locale, or that it cannot load all the required DLLs, it then attempts to load the operating system defined default locale (step 322). Note that the operating system defined default locale may be different than the user requested default locale issued at an operating system prompt. This is done to help insure that an application always starts, regardless of what the requested default locale may be. If a failure occurs at this level, extended locale object 48 interprets this as a catastrophic operating system failure and then halts all execution of application 44, destroys itself, and returns control back to the current operating system session (step 324).

Once extended locale object 48 has successfully loaded all required resources, control is then returned to application 44 (step 326). Next, a localization information request is performed. If, during execution, application 44 finds itself needing any operating system defined localization information, it simply sends a request message to extended locale object 48 for the information.

Figure 4:
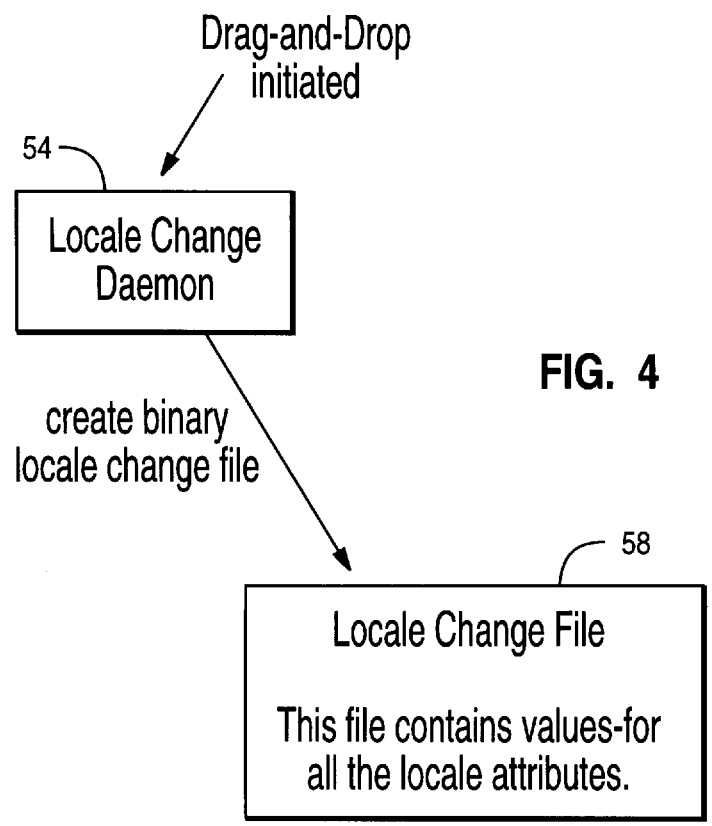
FIG. 4 is a block diagram representing the implementation of the drag and drop initialization using a local change daemon.

During the execution of application 44, the user can request that application 44 change locales. This change takes place by using the locale change daemon application. FIG. 4 is a block diagram representing the implementation of the drag and drop initialization using local change daemon 54. Locale change daemon 54 communicates with application 44 by using a drag and drop facility.

To start a locale change, a user simply drags an icon flag from locale change daemon 54 and drops it on an application 44. When a drag-drop is initiated, locale change daemon 54 creates a binary file, and places the locale change information in this binary file or locale change file 58. When the drop takes place, application 44 retrieves the name of locale change file 58. Application 44 then reads the file 58 and sends a message to extended locale object 48 telling it to change to a new locale SETlocale.

Figure 5:
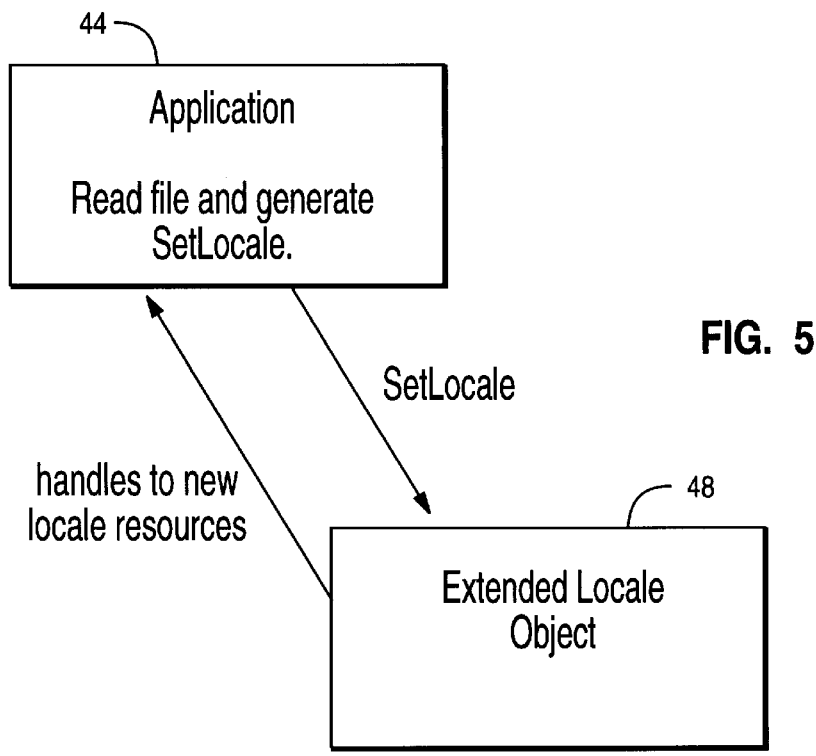
FIG. 5 is a block diagram showing the application locale change of the present invention.
Figure 6:
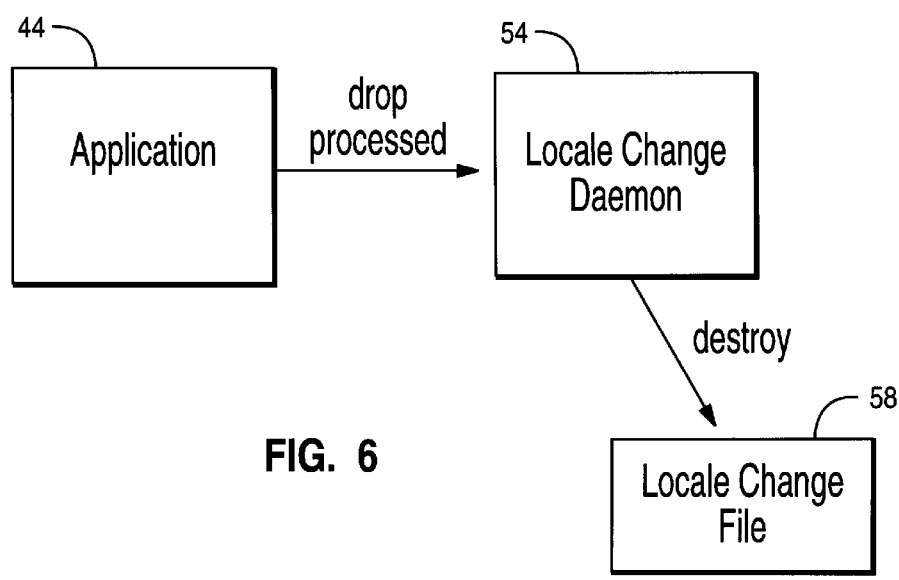
FIG. 6 is a block diagram depicting a drop being processed according to the present invention.

FIG. 5 is a block diagram illustrating the application locale change in block diagram form. As shown in FIG. 5, application 44 reads the locale change file, and sends a message to extended locale object 48 telling it to change to a new locale. Extended locale object 48 returns a handle to the new locale resources. Next, as shown in FIG. 6, the drop is processed. When application 44 finishes reading locale change file 58, it signals to locale change daemon 54 that the drop has been processed. Locale change daemon then destroys locale change file 58.

Each application, or program, in the information handling system may have a different cultural profile. For example, a user may choose to run a spreadsheet application using one cultural profile, and a word processing program using a different cultural profile. In addition, a change to one application's cultural profile has no effect on any other application's cultural profile.

In addition to benefitting operating system vendors and application programmers, the present invention provides users with the benefit of being able to create new cultural profiles as needed. One reason a user may need to create a new cultural profile is that operating system vendors and application programmers can not possibly foresee all the possible cultural profiles that may be needed. In addition, software companies, for various reasons, will not provide cultural profiles for every possible profile.

Figure 7:
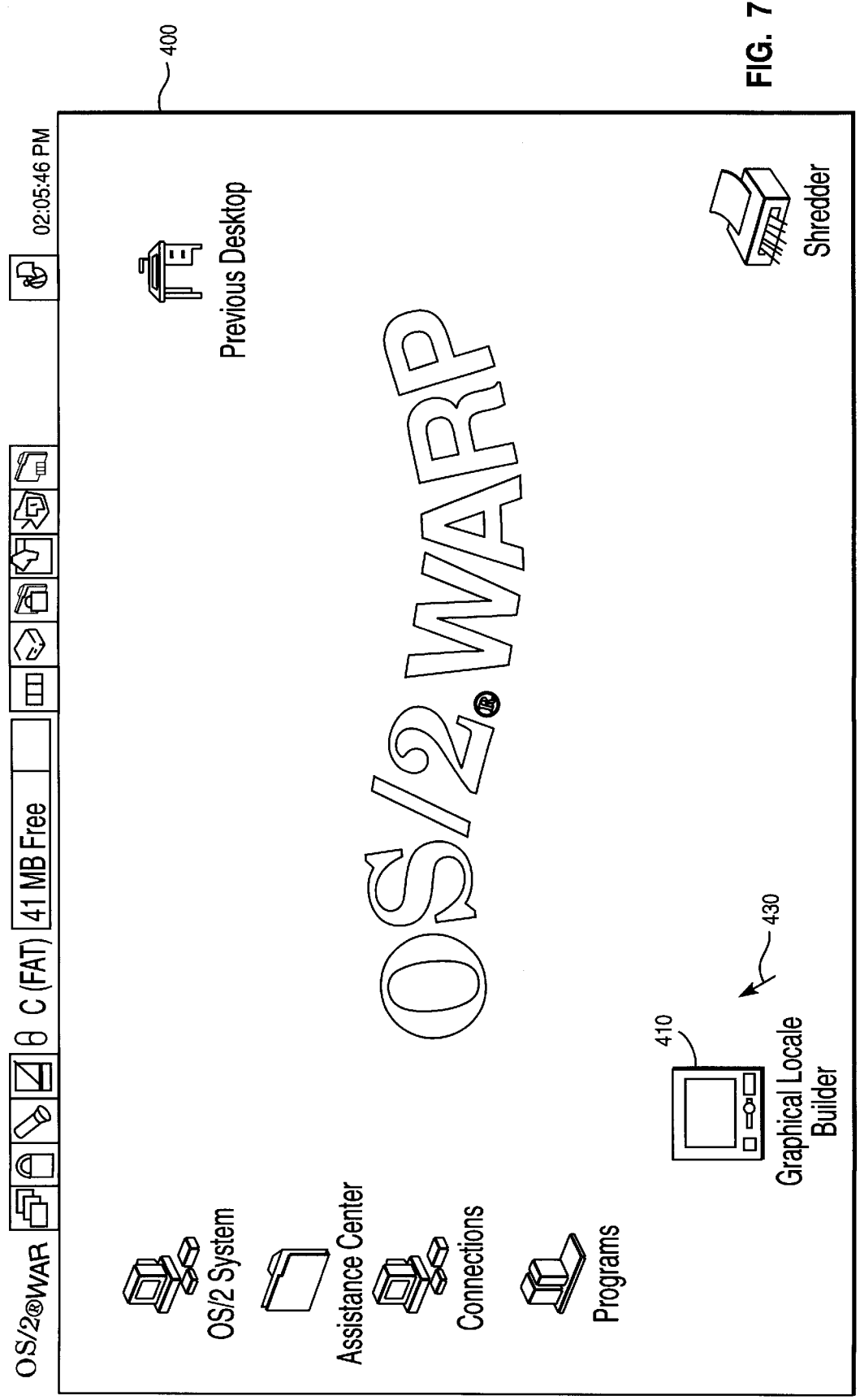
FIGS. 7 through 11 are screen displays depicting a graphical user interface method for dynamically creating a new cultural profile according to the present invention.

FIGS. 7 through 11 depict the steps a user takes to create a new cultural profile. Referring now to FIG. 7, a screen display 400 is depicted. Screen display 400 is presented to the user on display device 38 of FIG. 1. Screen display 400 includes graphical locale builder icon 410. To access the graphical locale builder of the present invention, a user selects graphical locale icon 410, using cursor 430. Typically, a user will select a particular icon by using mouse 26 to move cursor 430 on screen display 400. To select graphical locale builder icon 410, the user moves cursor 430 over graphical locale builder icon 410, and double-clicks mouse button 17a.

Figure 8:
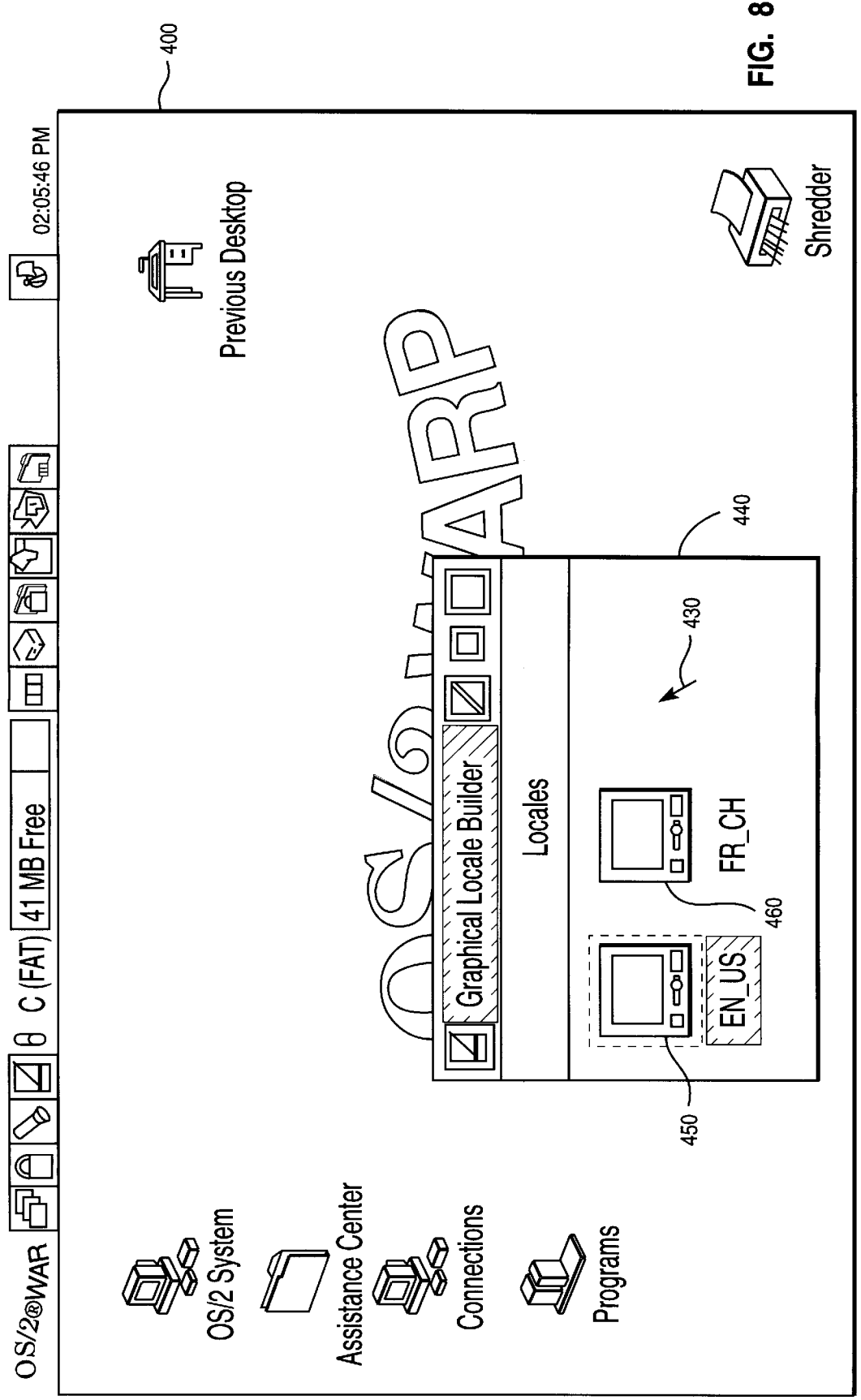
Figure 9:
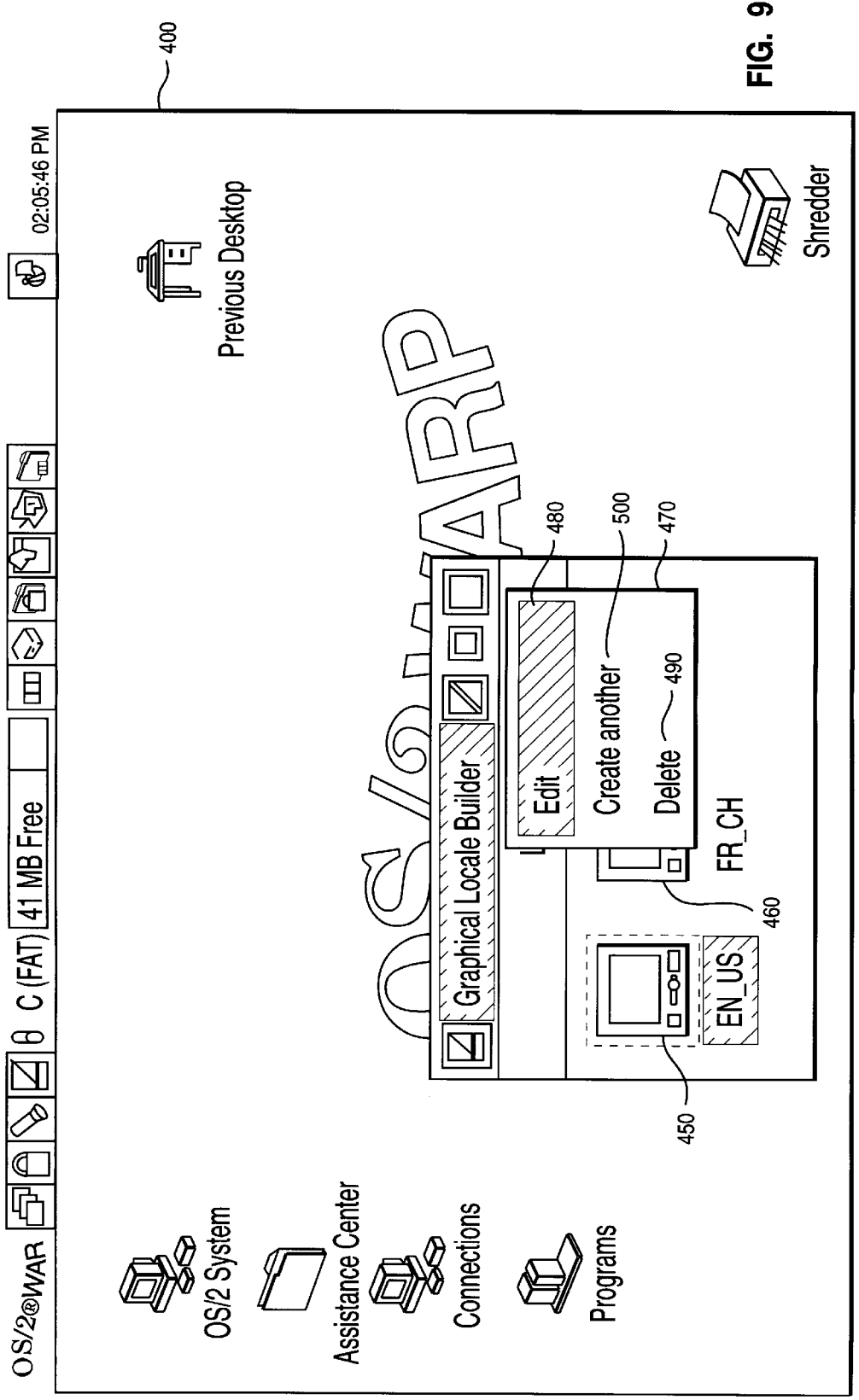

Graphical locale builder window 440 is then displayed, as shown in FIG. 8. In window 440, two currently existing locale objects are shown, EN_US 450 and FR_CH 460. EN_US 450 is the cultural profile for "English in the United States," and FR_CH is the cultural profile for "French in Switzerland." Suppose that a user desires to create a new cultural profile for "French in the United States." With cursor 430 in window 440, the user clicks mouse button 17b to bring up menu 470, as shown in FIG. 9. Menu 470 contains three options. The user may select edit option 480 to modify an existing cultural profile. The user may select delete option 490 to delete an existing cultural profile. The user may select create another option 500 to create a new cultural profile.

Figure 10:
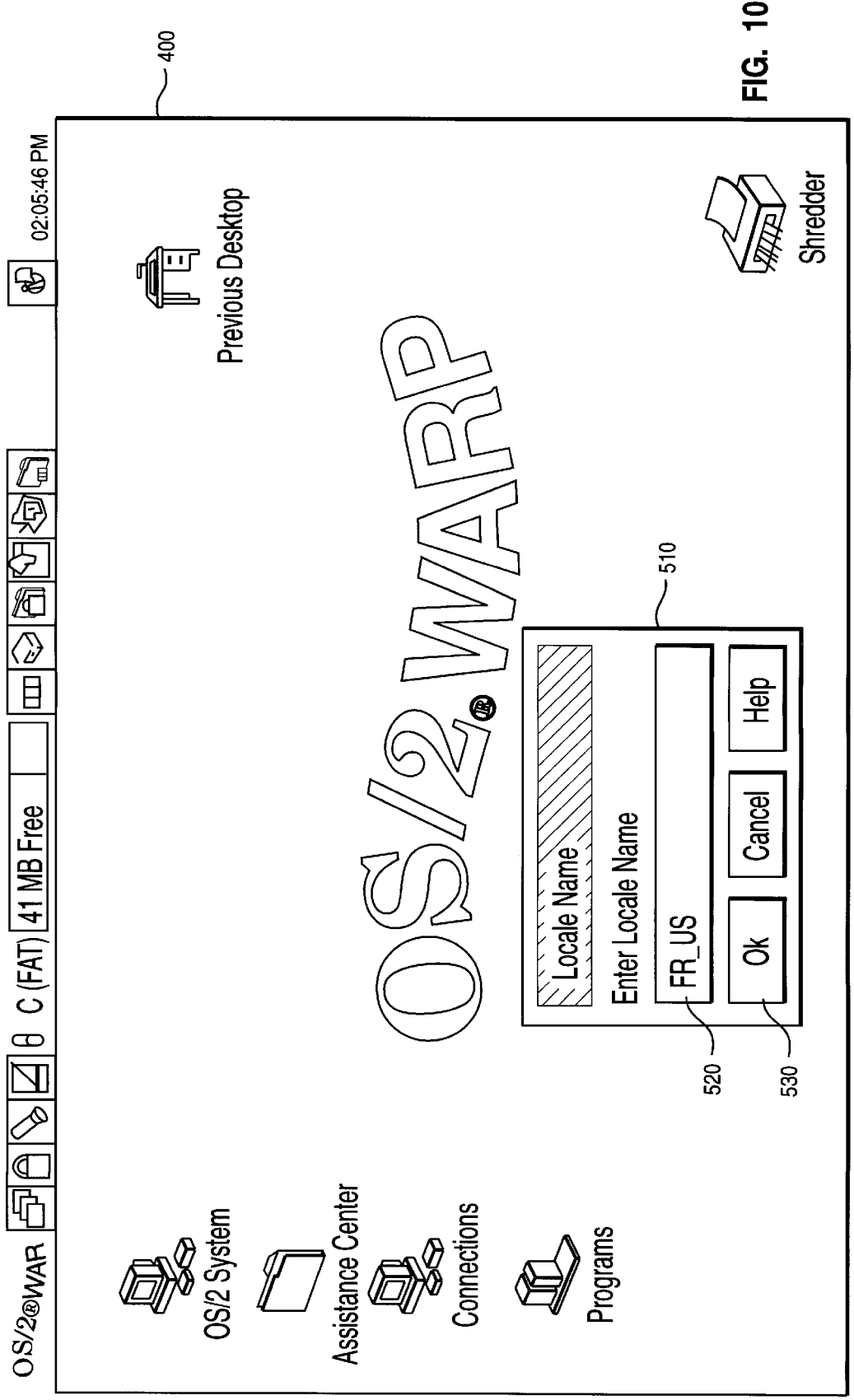
Figure 11:
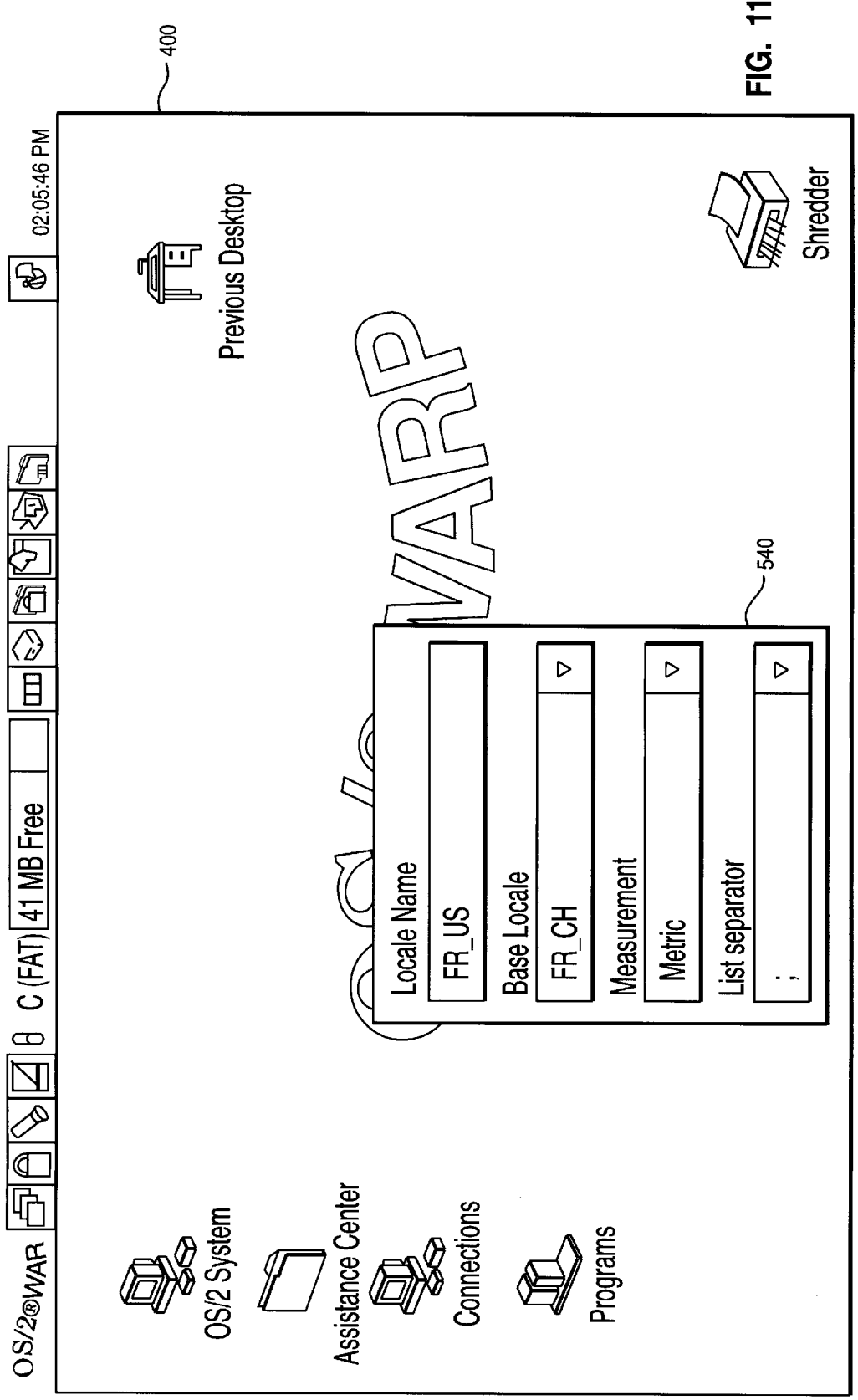

If the user selects create another option 500, locale name window 510 is displayed, as shown in FIG. 10. The user types a name in locale name box 520, and then clicks on OK button 530. In FIG. 9, the user has typed "FR_US" in locale name box 520. After clicking OK button 530, window 540 is displayed, as shown in FIG. 11. The user then proceeds to customize the new cultural locale using window 540 and other similar windows. For example, the user may base "FR US" on "EN_US," but will change the measurement system used to metric (as shown in FIG. 11).

When the user completes customization of "FR_US," it is available immediately for use as a cultural profile. The user does not have to reboot the information handling system in order to use "FR_US."

To implement the process depicted in FIGS. 7 through 11, the system and method of the present invention uses two files, locale.dll and user.loc. Locale.dll is a read-only dynamically linked library. It is part of the information handling system and contains all system-defined cultural profiles. When the operating system is loaded, locale.dll is brought into memory (i.e. copied into a memory area). User.loc is a file that contains all new user-defined cultural profiles, and also contains any user modifications to the system-defined cultural profiles. After the system loads locale.dll, the system then checks to see if there is a user.loc file. If so, the values in user.loc overwrite the copied values in locale.dll, wherever it is appropriate to overwrite these values.

When a user creates a new cultural profile (as depicted in FIGS. 7 through 11), the new cultural profile is added to user.loc. When a user modifies an existing cultural profile, the user.loc file is also used to store the user modifications. Finally, when a user deletes a cultural profile, user.loc is updated to indicate that the deleted cultural profile is no longer available for use. It is important to note that the creation, modification, and deletion of cultural profiles is dynamic. In other words, a newly created cultural profile is immediately available for use in the information handling system, with no need to reboot the system. Similarly, cultural profiles may be dynamically modified or deleted. The modifications and deletions are effective immediately, with no need to reboot the system.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. An information handling system, comprising:
   one or more processors;
   storage means;
   input/output means;
   display means;
   one or more images of an operating system for controlling operation of said processors;
   means for storing one or more cultural profiles in said storage means;
   means for executing one or more programs, wherein each program is associated with one or more of the cultural profiles;
   means for dynamically defining a new cultural profile; and
   means for dynamically changing the associated cultural profile of a selected program, wherein the selected program dynamically becomes associated with the new cultural profile.

2. An information handling system according to claim 1, wherein said means for storing comprises means for storing system-defined cultural profiles in a dynamically linked library.

3. An information handling system according to claim 1, wherein said means for dynamically defining a new cultural profile further comprises means for dynamically modifying a selected cultural profile to create the new cultural profile.

4. An information handling system according to claim 1, further comprising means for dynamically deleting a selected cultural profile.

5. An information handling system according to claim 1, wherein said means for dynamically defining a new cultural profile comprises:
   means for allowing a user to select an existing cultural profile; and
   in response to a user selected existing cultural profile, means for basing the new cultural profile on the user-selected existing cultural profile.

6. An information handling system according to claim 5, further comprising:
   means for allowing the user to select a feature of the new cultural profile;
   in response to the user selection, means for allowing the user to customize the selected feature; and
   in response to the user customization of the selected feature, means for modifying the new cultural profile according to the user customization.

7. A method for globalizing an information handling system, comprising the steps of:
   storing one or more cultural profiles in a storage means;
   executing one or more programs, wherein each program is associated with one or more of the cultural profiles;
   dynamically defining a new cultural profile; and
   dynamically changing the associated cultural profile of a selected program, wherein the selected program dynamically becomes associated with the new cultural profile.

8. A method according to claim 7, wherein said storing step comprises the step of storing system-defined cultural profiles in a dynamically linked library.

9. A method according to claim 7, wherein said step of dynamically defining a new cultural profile further comprises the step of dynamically modifying a selected cultural profile to create the new cultural profile.

10. A method according to claim 7, further comprising the step of dynamically deleting a selected cultural profile.

11. A method according to claim 7, wherein said step of dynamically defining a new cultural profile comprises the steps of:
    allowing a user to select an existing cultural profile; and
    basing the new cultural profile on the user-selected existing cultural profile.

12. A method according to claim 11, further comprising the steps of:
    allowing the user to select a feature of the new cultural profile;
    allowing the user to customize the selected feature; and
    modifying the new cultural profile according to the user customization.

13. A method for globalizing an information handling system, comprising the steps of:
    storing one or more cultural profiles in a storage means;
    executing one or more programs, wherein each program is associated with one or more of the cultural profiles; and
    dynamically creating a new cultural profile, wherein the new cultural profile is available for immediate use by one or more of the programs.

14. A method according to claim 13, further comprising the step of dynamically modifying a selected cultural profile.

15. A method according to claim 13, further comprising the step of dynamically deleting a selected cultural profile.

16. A computer-readable medium, comprising:
    means for storing one or more cultural profiles in a storage means;
    means for executing one or more programs, wherein each program is associated with one or more of the cultural profiles;
    means for dynamically defining a new cultural profile; and
    means for dynamically changing the associated cultural profile of a selected program, wherein the selected program dynamically becomes associated with the new cultural profile.

17. A computer-readable medium according to claim 16, wherein said means for storing comprises means for storing system-defined cultural profiles in a dynamically linked library.

18. A computer-readable medium according to claim 16, wherein said means for dynamically defining a new cultural profile further comprises means for dynamically modifying a selected cultural profile to create the new cultural profile.

19. A computer-readable medium according to claim 16, further comprising means for dynamically deleting a selected cultural profile.

20. A computer-readable medium according to claim 16, wherein said means for dynamically defining a new cultural profile comprises:
    means for allowing a user to select an existing cultural profile; and in response to a user selected existing cultural profile, means for basing the new cultural profile on the user-selected existing cultural profile.

21. A computer-readable medium according to claim 20, further comprising:

means for allowing the user to select a feature of the new cultural profile;

in response to the user selection, means for allowing the user to customize the selected feature; and in response to the user customization of the selected feature, means for modifying the new cultural profile according to the user customization.

* * * * *